United States Patent [19]
Van Cappellen

[11] 3,816,886
[45] June 18, 1974

[54] APPARATUS FOR LONGITUDINALLY STRETCHING FILM

[75] Inventor: Jan Baptist Van Cappellen, Berchem, Belgium

[73] Assignee: AGFA-Gevaert N. V., Mortsel, Belgium

[22] Filed: Oct. 29, 1971

[21] Appl. No.: 193,706

[30] Foreign Application Priority Data
Oct. 30, 1970  Great Britain .................. 51780/70

[52] U.S. Cl. ...................... 26/68, 264/288, 425/66
[51] Int. Cl. ......................... B29d 7/24, D06c 3/00
[58] Field of Search ................... 26/54, 68; 425/66; 264/288, 268

[56] References Cited
UNITED STATES PATENTS

| | | | |
|---|---|---|---|
| 2,547,763 | 4/1951 | Land et al. | 264/288 |
| 3,068,528 | 12/1962 | Owens | 26/54 X |
| 3,104,937 | 9/1963 | Wyckoff et al. | 264/288 X |
| 3,201,826 | 8/1965 | Bruckner | 26/54 |
| 3,547,891 | 12/1970 | Snead et al. | 264/288 X |
| 3,619,460 | 11/1971 | Chill | 264/288 |
| 3,664,915 | 5/1972 | Gore | 264/288 X |

FOREIGN PATENTS OR APPLICATIONS

| | | | |
|---|---|---|---|
| 1,492,582 | 7/1967 | France | 264/288 |
| 887,346 | 1/1962 | Great Britain | 264/288 |
| 1,070,055 | 5/1967 | Great Britain | 264/288 |
| 437,757 | 11/1967 | Switzerland | 264/288 |
| 972,226 | 10/1964 | Great Britain | 425/66 |

*Primary Examiner*—Robert R. Mackey
*Attorney, Agent, or Firm*—William J. Daniel

[57] ABSTRACT

Apparatus for the molecular orientation of a polymeric film in the longitudinal direction, in which the film is pulled over two rotatable film supporting rollers which are closely spaced from each other and the first of which is heated and the second of which is cooled, the film is heated by an infrared heater which is located close to the rollers at the side of the film which is remote of the rollers, and in which the film is subjected to opposed tensional forces in order to stretch it longitudinally on its path from the first to the second roller.

5 Claims, 6 Drawing Figures

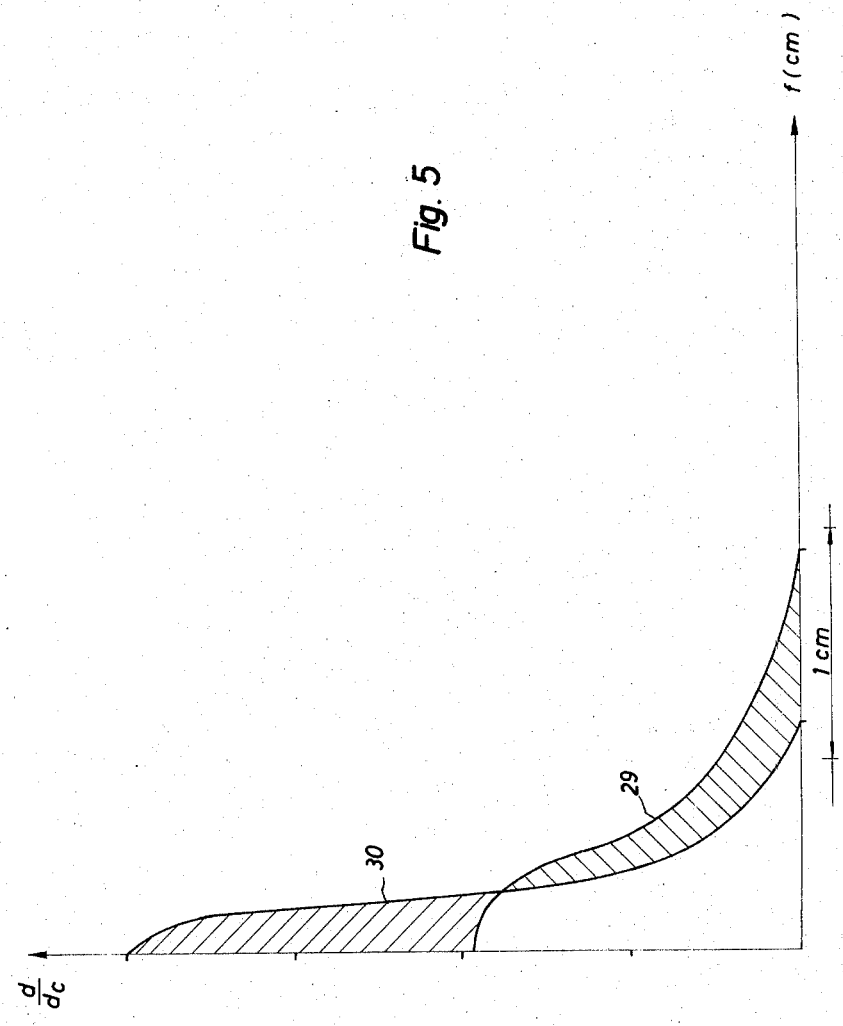

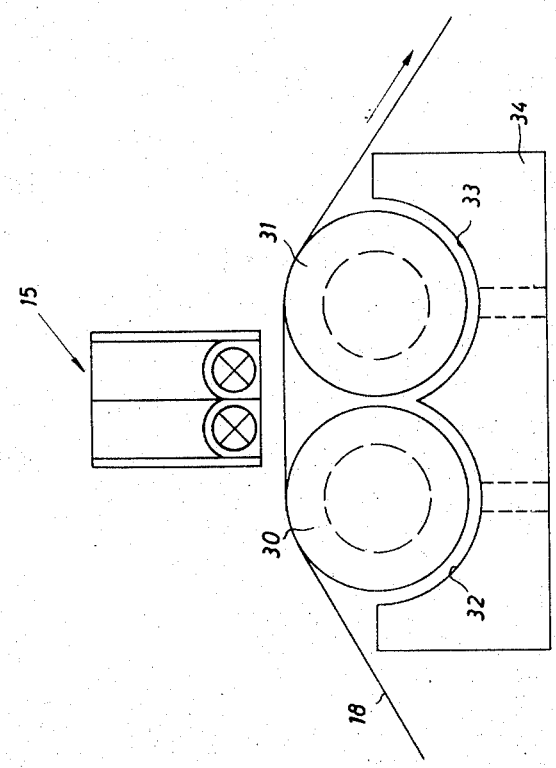

APPARATUS FOR LONGITUDINALLY STRETCHING FILM

The present invention relates to a method and an apparatus for longitudinally stretching continuous organic polymeric thermoplastic film.

In the extrusion type process of making polymeric film, the molten polymer is extruded through a slot-like orifice and the extruded molten polymer is received on a quenching drum on which the temperature of the extruded film is lowered through the softening range of the polymer. By stretching the quenched film longitudinally or both longitudinally and transversely while the polymer is at the lower end of the softening range, somewhat above the second order transition temperature, the polymer can be subjected to molecular orientation leading to an improvement in various physical properties of the film, notably its tensile strength.

The longitudinal stretching of the film is usually done by passing the film between several pairs of rollers and by driving the last pair or pairs of rollers at a higher peripheral speed than the first pair of rollers. Appropriate heaters between the pairs of rollers soften the film in a given region while it is being conveyed over the rollers so that the film is able to be stretched longitudinally in said heated region.

A considerable difficulty in the longitudinal stretching of a polymeric film is the necking-in of the softened film. This lateral contraction of the film causes the film to wrinkle in the longitudinal direction, particularly in the case of thin film — that is film with a thickness smaller than 300 μm — which is insufficiently stiff to prevent the formation of longitudinal wrinkles or folds. The wrinkled portions of the film lie closer to the heaters than do the remaining portions, so that the heating of the film is not uniform across its width, and as a consequence thereof, the longitudinally stretched film shows inhomogeneous properties across its width, notably as to its crystallinity. When the film is stretched transversely after the longitudinal stretching, the film width increases non-uniformly so that the thickness of the stretched film varies across its width.

The present invention aims at providing an improved method and apparatus for longitudinally stretching polymeric film, wherein the wrinkling of the film during the longitudinal stretching is avoided.

The invention further aims at providing a method and apparatus for longitudinally stretching polymeric film, wherein the so-called "edge-loss" of the film is not increased during the longitudinal stretching thereof. The lateral contraction of the film during the longitudinal stretching reduces the effective film width and the greater the transverse contraction, the greater is the edge-loss, i.e., the loss of material involved in cutting off the thickened film margins which result from the contraction. The improvement which may be afforded by the present invention is particularly important in case the film has already been longitudinally stretched between the extrusion orifice and the quenching drum, and thus has already thickened edges. By such longitudinal stretching amorphous film of substantially less thickness than the corresponding dimension of the extrusion orifice can be produced. This is of importance in the manufacture of thin film as defined already hereinbefore, because if the width of the extrusion orifice were to be as small as that, difficulties would arise due to the high pressure of the polymer in the extrusion head and the occurrence of so-called die lip streaks in the film.

According to the present invention, a method of longitudinally stretching continuous organic polymeric thermoplastic film comprises:

a. conveying the film over two rotatable cylindrical film supporting surfaces,
b. heating the first and cooling the second of said surfaces,
c. feeding the film at a first speed to the first of said rotatable supporting surfaces and pulling the film away over the second of said supporting surfaces at a second speed which is greater than said first speed,
d. softening the film in the tangent plane to the first and the second surface by subjecting the film to infra-red radiation which is directed towards the film surface, the distance ($L_a$) between the generatrix at which the contact between the film and the said first surface is broken and the transverse line where the softening of the film starts, being (very) small as compared with the distance ($L_b$) between said generatrix and the generatrix at which the film contacts the second surface.

According to a preferred embodiment of the method of the invention, the film is subjected to infrared radiation almost immediately after the contact between the film surface and the mentioned first rotatable film supporting surface is broken. In that way, the distance ($L_a$) over which the film is freely supported before the softening starts, may practically be reduced to zero so that the freedom for the film to transversely wrinkle is considerably reduced.

The invention also includes adapted apparatus to carry out the method above defined for longitudinally stretching continuous organic polymeric thermoplastic film. Apparatus according to the invention preferably comprises:

a. a pair of parallel rotatable film supporting rollers, each having a peripheral metal surface with mirror-like finish and the spacing between the rollers being not greater than some millimeters,
b. means for heating the first roller and means for cooling the second roller,
c. an elongate infrared heater, the frontside of which is closely spaced from a tangent plane to the rollers and the axis of which is located about halfway of the distance between the two roller axes, and
d. means for moving a film between the infrared heater and the pair of rollers so that the film comes into contact with the periphery of the first roller of said pair of rollers at a first speed, and is pulled over the second roller at a second speed which is higher than said first speed.

According to a preferred embodiment of the invention, the spacing between the rollers is not greater than 5 millimeters.

Since the invention has been developed in connection with the production of polyethylene terephthalate film, reference will be made to this material in particular in the further description, but it will be understood that the method and apparatus according to the invention may be used in the extrusion of other polymeric films as well which are suited for molecular orientation by stretching at the appropriate temperature.

The invention will be described hereinafter by way of example with reference to the accompanying drawings of which:

FIG. 5 is a diagram showing the edge loss of a film measured before and after the longitudinal stretching according to the invention.

FIG. 6 is a further embodiment of the apparatus according to the invention.

Figure 1:
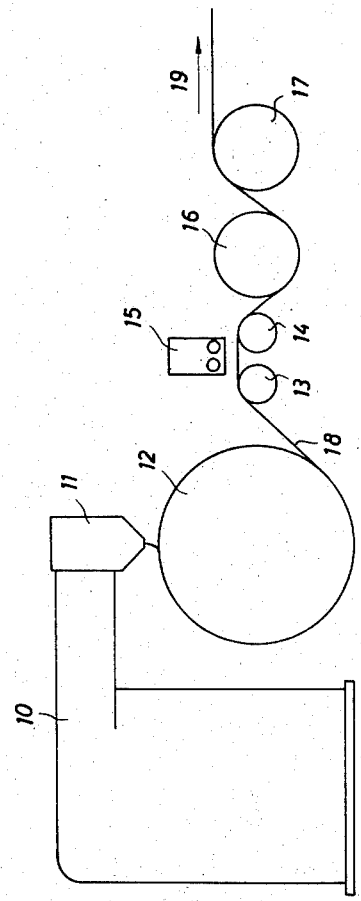
FIG. 1 is a diagrammatic view of an extruder arrangement wherein an apparatus for longitudinally stretching a film according to the invention is used.

The extruder arrangement which is shown in FIG. 1 comprises an extruder 10 with an extruder head 11, a quenching drum 12, two film supporting rollers 13 and 14, an infrared heater 15, and cooling rollers 16 and 17. A film 18 which is passed over said rollers is drawn away in the direction indicated by the arrow 19 and conveyed to a further destination. Said further destination may be a winding device, but it may also be, and in the production of polyethylene terephthalate film as described herein actually mostly is, a multiplicity of devices for the transverse stretching of the film, for the heat-setting, the after-stretching and the heat-relaxing of the film, for the trimming of the thickened edges, for the coating of the film, etc.

The quenching drum 12 is driven at a speed $v_1$, the rollers 16 and 17 are driven at a speed $v_2$ and the film supporting rollers 13 and 14 are freely rotatable. The purpose of the rollers 16 and 17 is to sufficiently and rapidly cool the film as it leaves the roller 14 because the time of contact with the roller 14 is insufficient to obtain a rapid cooling of the film. For the same reason, the free distance of the film path between the rollers 14 and 16, and 16 and 17 is kept as small as possible.

Figure 2:
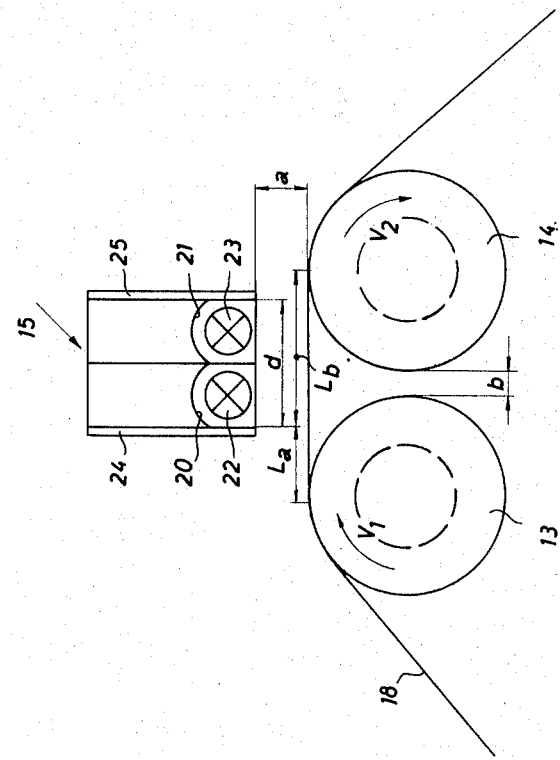
FIG. 2 is a more detailed view of the apparatus according to the invention.

The longitudinal stretching apparatus is shown more in detail in FIG. 2. The heater 15 is made of an elongate block of steel which is mounted transversely of the path of the film 18.

The steel block is provided with channels (not shown) through which a fluid coolant is circulated.

The front side of the heater is provided with two elongate grooves 20 and 21 which have a half cylindrical cross-section, and the lateral sides of the heater are provided with flat metal plates 24 and 25. Two infrared rod elements 22 and 23 are provided in the channels, and the surfaces of the heater which face the rod elements have a mirrorlike finish. The distance between the frontside of the heater and the tangent plane to the rollers 13 and 14 is indicated by $a$ whereas the width of the heater is indicated by $d$.

The film supporting rollers 13 and 14 are freely rotatable hollow cylinders, and in view of their relative small diameter, the inlet for the liquid heat transfer medium has been provided through a rotatable sealing at one end of their shaft, whereas the rotatable outlet for said liquid has been provided at the other end of their shaft (not shown in the drawing). The rollers have a mirrorlike finish and their mutual spacing is indicated by $b$. Although the rollers are not positively driven, the peripheral speeds of the rollers have been indicated by $v_1$ and $v_2$ since these speeds correspond practically with the speeds at which the film 18 is fed to, and respectively removed from, the rollers.

Figure 3:
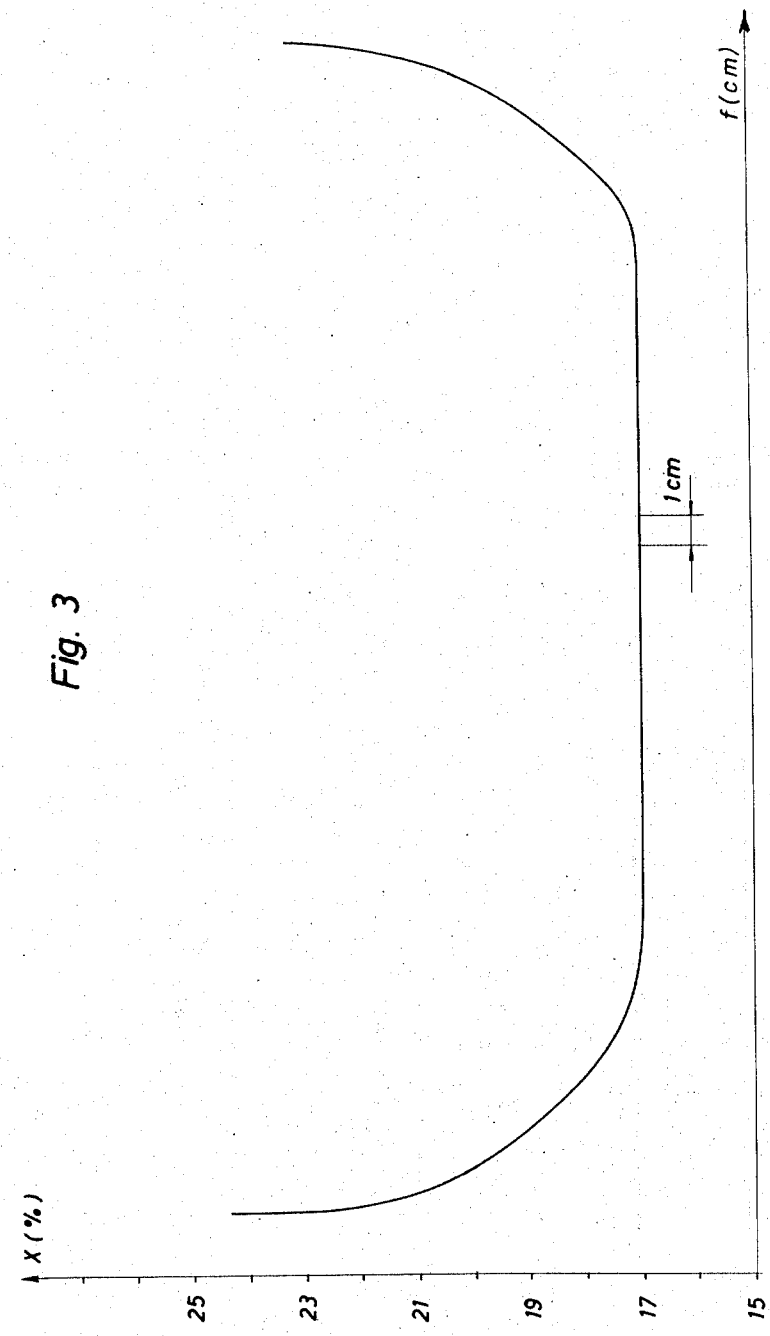
FIG. 3 is a diagram of the crystallinity of a film stretched on the device according to FIG. 1.

The diagram shown in FIG. 3 illustrates the uniformity of the crystallinity X across the width ($f$) of a polyethylene terephthalate film which was longitudinally stretched with the apparatus according to the invention.

The different parameters were as follows:

| | |
|---|---|
| Specific density of the polymer: | 1.33 gcm$^{-3}$ |
| Temperature $T_q$ of the quenching drum 12: | 65°C |
| Width of the film leaving the quenching drum 12: | 42.6 cm |
| Thickness of the film leaving the quenching drum 12: | 0.250 mm |
| Speed $v_1$ of the quenching drum 12 and of roller 13: | 8 m.min$^{-1}$ |
| Speed $v_2$ of the roller 14: | 29 m.min$^{-1}$ |
| Stretch ratio ($v_2/v_1$): | 3.6 |
| Temperature $T_1$ of roller 13: | 75°C |
| Temperature $T_2$ of roller 14: | 20°C |
| Distance $d$: | 28 mm |
| Distance $a$: | 5 mm |
| Distance $L_a$: | 11 mm |
| Distance $L_b$: | 31 mm |
| Spacing $b$: | 2 mm |
| Diameter of the rollers 13 and 14: | 40 mm |
| Length of the rollers 13 and 14: | 70 cm |
| Voltage applied to each rod element 22, 23: (nominal power of each element is 5 KWatt at 600 Volts) | 400 volts |
| Diameter of the rollers 16 and 17: | 80 cm |
| Temperature of the rollers 16 and 17: | 20°C |

It may be seen from the diagram that the cristallinity X remains very uniform across a substantial portion of the width of the film and that only near the edges an increase from 17 to 25 percent may be noted.

Figure 4:
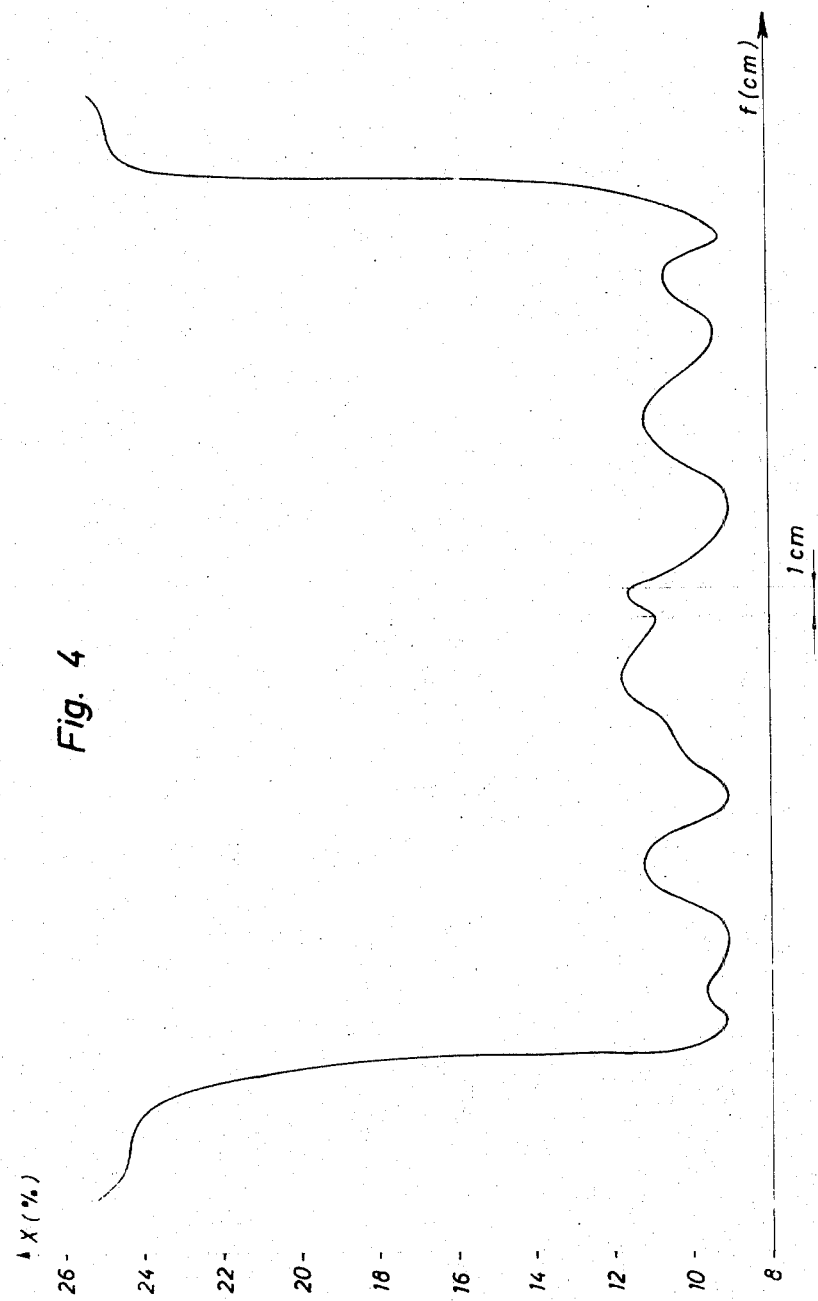
FIG. 4 is a diagram of the crystallinity of a film stretched in an apparatus with greater distance $L_a$.

The importance for the distance $L_a$ to be small as compared with the distance $L_b$ is illustrated by the diagram of FIG. 4 where the crystallinity X is plotted for the apparatus according to FIG. 2 wherein the spacing $b$ was increased to 40 mm so that the distance $L_a$ amounted to about 70 mm. The stretch ratio was 3.8 and $v_1$ and $v_2$ amounted to 2 m.min$^{-1}$ and 7.6 m.min$^{-1}$. The profile of the crystallinity is very irregular and varies between 9 and 12 percent in the central portion of the film. These variations are caused by the longitudinal wrinkling of the film which is promoted by the increased distance $L_a$, and which has as a direct consequence a non uniform heating of the film.

A second aim of the invention which was mentioned in the introduction of the description was the limitation of the edge loss of the film. This is illustrated by the diagram of FIG. 5 which shows the ratio of the film thickness at the edges to the film thickness at the centre, i.e., $d/d_c$, as a function of the film width $f$.

The curve 29 represents the edge profile of the film before it was longitudinally stretched on the apparatus as shown in FIG. 2, the curve 30 is the edge profile of the film after the longitudinal stretching. The film to be longitudinally stretched was obtained by extruding a polyethylene terephthalate film through an extrusion orifice measuring 2 mm by 450 mm and by stretching the molten film about 12 times in the gap between the extrusion orifice and the quenching drum, so that an amorphous polymeric film was obtained with a total width of 426 mm and thickened edges with a profile as represented by the curve 29 of FIG. 5.

The following may be seen from the diagram of FIG. 5.

The width of a thickened edge is about 17.5 mm before the longitudinal stretching, and 10 mm thereafter.

The outerside of a thickened edge becomes thicker after the longitudinal stretching. The surfaces of the hatched areas equal almost each other. Thus, it may be concluded that the edge thickening as a consequence of the contraction during the longitudinal stretching takes only place within the thickened edge which was already caused by the longitudinal stretching between extrusion orifice and quenching drum.

The different parameters of the apparatus on which the longitudinal stretching occurred were as follows:

| | |
|---|---|
| Speed $v_1$ of roller 13: | 6.6 m.min$^{-1}$ |
| Speed $v_2$ of roller 14: | 25 m.min$^{-1}$ |
| Stretch ratio: | 3.8 |
| Temperature $T_1$ of roller 13: | 75°C |
| Temperature $T_2$ of roller 14: | 20°C |
| Distance d: | 28 mm |
| Distance a: | 10 mm |
| Total width of the film before stretching: | 426 mm |
| Total width of the film after stretching: | 415 mm |

In connection with the production of thin amorphous film as used for the longitudinal stretching as described hereinbefore, I refer to Belgian Pat. No. 751,428 filed June 3, 1970, wherein a method of producing film has been disclosed which comprises the steps of extruding molten polymeric material through a slot orifice to form a molten film, stretching the film longitudinally by drawing the film away from the extrusion orifice faster than the extrusion speed before the film is received on a quenching surface, and contacting the film between the extrusion orifice and the quenching surface over its full width with a cooled control surface, the temperature of said surface, its spacing from the extrusion orifice and the slip-resisting frictional contact between the film and such surface being such that the extruded film is still molten when it contacts such surface but necking-in of the film is abruptly arrested on such surface.

Some practical aspects of an apparatus according to the invention are discussed hereinafter.

The diameter of the film-supporting rollers 13 and 14 being relatively small with respect to their length, the rollers are liable to bending. Therefore, the contact angle between the film and the rollers must preferably not exceed an angle of about 45 degrees, as shown in FIGS. 2 and 3, in order to limit the forces applied to the rollers in accordance with the formula $R = 2 K \sin \alpha/2$, wherein R is the reaction force on the roller, K is the tensioning of the film and $\alpha$ is the contact angle between roller and film.

On the other hand, the contact angle must be great enough to ensure a sufficient heat transfer from or to the film. A measure which may help in the heat transfer process of the film is to keep the free film path between the quenching drum and the first film supporting roller 13 small so that the film is not allowed to cool down over its path from the quenching drum to the roller 13, and to provide additional cooling rollers 16 and 17 closely behind the second film supporting roller 14, so that the film temperature may be rapidly lowered after the longitudinal stretching of the film.

The bending of the film supporting rollers is proportional to the third power of the length of the rollers, and in view thereof the length of the rollers must not be taken much greater than the width of the film. In any way, the rollers shall extend a few centimeters at either side of the film in order to avoid edge effects as to the heating or cooling of the film.

An embodiment of the apparatus according to the invention wherein the bending of the film supporting rollers does not occur is shown in FIG. 6. The rollers 30 and 31 are hollow cylinders which are provided with rotatable sealings at the extremities for the passage of a cooling or heating liquid, and which are supported by an air-cushion which is established between the rollers and elongate half-cylindrical surfaces 32 and 33 in a steel support member 34. The lower points of the half-cylindrical surfaces are provided with a plurality of openings (not shown) through which pressurized air is continuously fed into the gap between the member 34 and the rollers.

The amount of pressurized air which escapes from the gap between the rollers and the support member 34 at the upper side of the gap is very small per unit of time, and it has been shown that this air does not interfere with the heating and the cooling of the film by the rollers 30 and 31. The described embodiment is particularly useful in the production of films of larger widths, i.e., films having a width of more than 1 meter.

The pressure of the film onto the film supporting rollers is inversely proportional to the diameter of the rollers. It is thus clear that relatively high pressures may occur, and in view thereof it is necessary to avoid the deposition of dust particles on the film or on the roller surfaces because such particles may be impressed in the film surface as a consequence of said relative high contact pressure.

In the embodiments described so far, the surface of the film-supporting rollers 13 and 14 had a mirrorlike finish. It will be understood that such kind of surface is effective in reflecting the infra-red radiation which has passed through the film in the heating region. The rapid heating of the film is thus promoted by this reflected radiation, especially in case the spacing b between the rollers is very small.

It will be understood that the device according to the invention is not limited to the described embodiments.

The two infra-red rod heaters may be replaced by only one rod heater if the film is sufficiently thin to permit a sufficiently rapid heating to the required temperature.

Also the film-supporting rollers may be driven. In such case, however, the peripheral speed of the first film-supporting roller is preferably slightly higher than the speed of the quenching drum, and the speed of the second film-supporting roller slightly smaller than the corresponding speed of the next roller, in order to ensure a sufficient tensioning of the film on the film-supporting rollers.

I claim:

1. In an apparatus for longitudinally stretching continuous, organic polymeric, thermoplastic film moving along a predetermined path, an improved film softening arrangement comprising:

a. a pair of mirror-finished rotatable rollers of a width at least substantially equal to the film width arranged in parallel adjacent non-contacting relation, said rollers being sufficiently close together that mutually facing arcuate peripheral portions thereof define a convex-sided V, said film path passing in generally planar fashion over the open top end of said V in at least tangential contact with the roller peripheries at the respective ends of said V, whereby radiation passing through said film path into said V is reflected by the arcuate sides thereof backwardly toward said film path,
b. an elongated infrared heater disposed on the opposite side from said rollers of said film path over the open end of said V and in close proximity to said film path to direct infrared radiation over substantially the entire film width, said heater having its axis parallel to the film path plane at a locus approximately equidistant from the axes of said rollers,
c. means independent from said elongated heater for heating the upstream roller and means for cooling the downstream roller, and
d. means for advancing said film along said path so that the film is stretched while passing across the top of said V and said second roller turns at a higher peripheral speed than said first roller.

2. Apparatus according to claim 1, wherein said rollers are freely rotatable.

3. Apparatus according to claim 1 wherein said means for advancing said film along said path comprises a cooling drum for the film which is located downstream of the second of the film supporting rollers and which is disposed so that the unsupported length of the film between said second roller and said drum is small.

4. Apparatus according to claim 1 wherein said means for advancing said film along said path includes guide means for delivering said film to and from said pair of rollers, said guide means being disposed such that the film is in contact with an arcuate portion of the respective roller peripheries not greater than about 45°.

5. Apparatus according to claim 1 wherein the clearance between the roller peripheries at the bottom of said V is not greater than about 5 mm.

* * * * *